(12) United States Patent
Weitenberg et al.

(10) Patent No.: US 11,172,613 B2
(45) Date of Patent: Nov. 16, 2021

(54) ARRANGEMENT FOR CONTROLLING THE HEIGHT AND/OR INCLINE OF A COMBINE HEADER FOR HARVESTING THIN-STEMMED CROPS

(71) Applicant: DEERE & COMPANY, Moline, IL (US)

(72) Inventors: Clemens Weitenberg, Borken (DE); Juergen Effsing, Ahaus (DE)

(73) Assignee: DEERE & COMPANY, Moline, IL (US)

( * ) Notice: Subject to any disclaimer, the term of this patent is extended or adjusted under 35 U.S.C. 154(b) by 193 days.

(21) Appl. No.: 16/556,363

(22) Filed: Aug. 30, 2019

(65) Prior Publication Data

US 2020/0084968 A1 Mar. 19, 2020

(30) Foreign Application Priority Data

Sep. 13, 2018 (DE) ......................... 102018215616.6

(51) Int. Cl.
*A01D 41/14* (2006.01)
*A01D 41/16* (2006.01)
(Continued)

(52) U.S. Cl.
CPC ......... *A01D 41/141* (2013.01); *A01D 41/142* (2013.01); *A01D 41/145* (2013.01);
(Continued)

(58) Field of Classification Search
CPC .. A01D 41/141; A01D 41/142; A01D 41/145; A01D 41/16; A01D 75/287; A01D 45/021; A01D 61/008; A01D 34/8355
See application file for complete search history.

(56) References Cited

U.S. PATENT DOCUMENTS 3,984,966 A * 10/1976 Outtier ................. A01D 45/021
56/10.2 R
5,471,825 A * 12/1995 Panoushek ........... A01D 41/141
56/10.2 E
(Continued)

FOREIGN PATENT DOCUMENTS

DE      3515295 A1 * 10/1986 ........... A01D 45/021
DE      29519842 U1    2/1996
(Continued)

OTHER PUBLICATIONS

European Search Report issued in counterpart European Patent Application No. 19192796.1 dated Feb. 10, 2020 (5 pages).

*Primary Examiner* — Arpad Fabian-Kovacs

(57) ABSTRACT

An arrangement for controlling the height and/or incline of a combine header for harvesting thin-stemmed crops includes a control system which is connected to a sensor for detecting the height of the combine header above the ground, and to an actuator for controlling the height and/or incline of the combine header and which can be operated to control the actuator in dependence on signals of the sensor. A mulching appliance with a cultivating tool for shredding plant stumps is attached to the combine header in a vertically movable manner following the contour of the ground, and the sensor is set up to detect the position of the mulching appliance relative to the combine header.

1 Claim, 1 Drawing Sheet

(51) Int. Cl.
*A01D 75/28* (2006.01)
*A01D 45/02* (2006.01)
*A01D 61/00* (2006.01)

(52) U.S. Cl.
CPC ............ *A01D 41/16* (2013.01); *A01D 75/287* (2013.01); *A01D 45/021* (2013.01); *A01D 61/008* (2013.01)

(56) References Cited

U.S. PATENT DOCUMENTS

| | | | | |
|---|---|---|---|---|
| 6,588,187 | B2* | 7/2003 | Engelstad | A01D 46/08 56/10.2 E |
| 7,730,700 | B2* | 6/2010 | Nathan | A01D 41/141 56/10.2 E |
| 9,198,351 | B2* | 12/2015 | Tilly | A01D 45/021 |
| 9,578,804 | B2* | 2/2017 | Gessel | A01D 45/023 |
| 9,980,431 | B2* | 5/2018 | Long | A01D 41/127 |
| 10,058,027 | B2* | 8/2018 | Gessel | A01D 34/015 |
| 10,292,333 | B2* | 5/2019 | Missotten | A01D 41/06 |
| 10,694,671 | B2* | 6/2020 | Terryn | A01D 45/023 |
| 2004/0006958 | A1 | 1/2004 | Thiemann | A01D 41/141 56/10.2 R |
| 2004/0187461 | A1* | 9/2004 | Rickert | B60K 25/06 56/14.2 |
| 2010/0083627 | A1* | 4/2010 | Nagy | A01D 45/021 56/60 |
| 2011/0099962 | A1* | 5/2011 | Coers | A01D 41/141 56/10.4 |
| 2012/0042618 | A1* | 2/2012 | Lohrentz | A01D 45/021 56/60 |
| 2012/0055131 | A1* | 3/2012 | Zegota | A01D 45/021 56/60 |
| 2014/0311115 | A1* | 10/2014 | Verhaeghe | A01D 47/00 56/251 |
| 2014/0319253 | A1* | 10/2014 | Nurnberg | A01D 43/12 241/101.4 |
| 2015/0257337 | A1* | 9/2015 | Schrattenecker | A01D 45/025 56/60 |
| 2016/0066504 | A1* | 3/2016 | Holman | A01D 34/8355 56/504 |
| 2018/0020617 | A1* | 1/2018 | Weitenberg | A01D 34/71 56/503 |

FOREIGN PATENT DOCUMENTS

| | | | | |
|---|---|---|---|---|
| DE | 19916645 | A1 | 10/2000 | |
| DE | 102004020447 | A1 * | 12/2005 | ......... A01D 34/8355 |
| DE | 102010028605 | A1 | 11/2011 | |
| EP | 0423626 | A1 * | 4/1991 | ......... A01D 34/8355 |
| EP | 1044595 | A1 | 10/2000 | |
| EP | 1145619 | A1 | 10/2001 | |
| EP | 1374661 | A1 | 1/2004 | |
| EP | 2384612 | A2 | 11/2011 | |
| EP | 3269223 | A1 | 1/2018 | |
| EP | 3272199 | A1 | 1/2018 | |

* cited by examiner

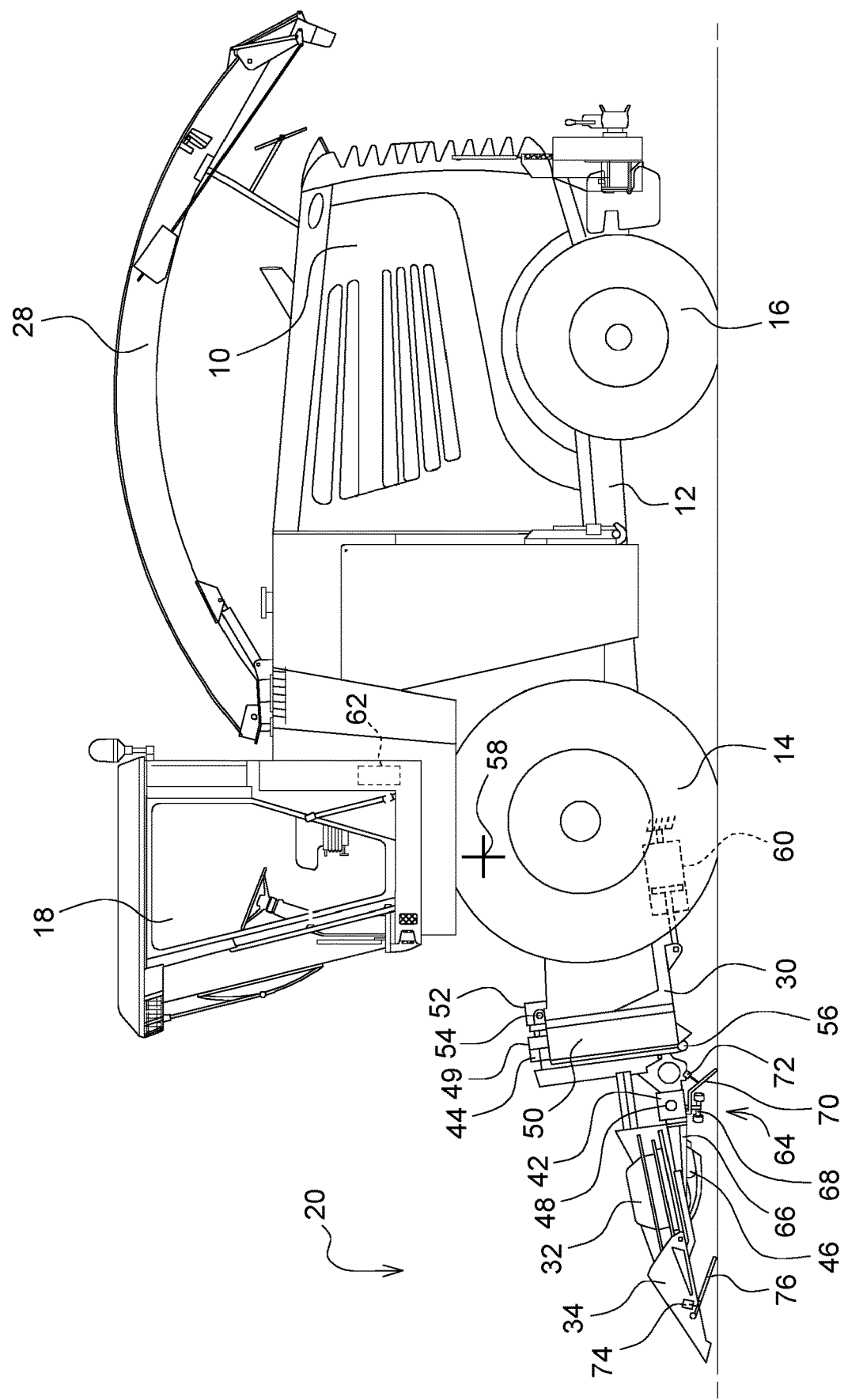

ARRANGEMENT FOR CONTROLLING THE HEIGHT AND/OR INCLINE OF A COMBINE HEADER FOR HARVESTING THIN-STEMMED CROPS

CROSS-REFERENCE TO RELATED APPLICATIONS

This application claims the benefit of German Patent Application No. 102018215616.6, filed on Sep. 13, 2018, the disclosure of which is hereby incorporated by reference.

TECHNICAL FIELD

The disclosure generally relates to an arrangement for controlling the height and/or incline of a combine header for harvesting thin-stemmed crops.

BACKGROUND

When harvesting thin-stemmed crops, cutters are normally used for grain crops and pickers or corn cutting attachments are used for corn crops. These combine headers are mounted on self-propelled harvester machines, such as combine harvesters or field choppers. During harvesting operations, the combine headers move the cut harvested crop into a feed conveyor of the harvester machine.

It is important for the proper functioning of the cutting system that it is held at a specific angle in relation to the ground. Whilst the cutting tools and their blades are to be oriented approximately parallel to the ground, this angle amounts to about 10° in the case of corn cutting attachments. The combine header should moreover be guided at a predetermined level above the ground in order on the one hand to pick up as much of the crop as possible, but on the other hand not to penetrate into the uplift of the ground. To control the height of the combine header suitable sensors are used which detect mechanically or contactlessly the height of the combine header above the ground and are connected to a control which in turn, by means of a remote-controlled actuator, adjusts the turning angle of the feed conveyor of the harvester about an axis running horizontally and transversely to the forward direction.

The angle of the combine header in relation to the ground depends on the contour of the ground and also on parameters of the harvester, in particular on the size of the wheels. To adapt the angle of the combine header by way of example to the wheel size of the harvester it is proposed to mechanically adjust the angle of the combine header with respect to the feed conveyor about the axis running horizontally and transversely to the forward direction (DE 199 16 645 A1, DE 10 2010 028 605 A1), which however does not allow any adjustment during the running harvesting operation in order to carry out by way of example an adaption to the contour of the ground. Adjusting the combine header about an axis running horizontally and transversely to the forward direction in relation to the feed conveyor, by means of sensor-based sensors detecting the contour of the ground was described in DE 295 19 842 U1, EP 1 145 619 A1 and EP 1 374 661 A1. These arrangements require two sensors of which one measures the height of the cutting tool above the ground, whilst a second sensor serves to keep the harvester machine horizontal by adjusting the vertically-adjustable wheels, and also controls the pivot angle of the combine header (DE 295 19 842 U1, EP 1 145 619 A1), whilst EP 1 374 661 A1 proposes detecting at two places spaced apart in the direction of travel the height of the combine header above the ground, and controlling the actuators for adjusting the height and incline of the combine header based on the incline of the ground derived therefrom. For this, by way of example, forward looking, from the combine header, sensors are used operating contactlessly, whilst scanning bars are arranged behind same in the direction of travel.

In many cases, mulching appliances for pulverizing and/or shredding the plant stumps remaining on the ground after harvesting are attached underneath the combine headers, whether for protecting the tires of the vehicles driving on the field, for improving the decomposition of the plant residues or for destroying wintering area of the European corn borer (*Ostrinia nubilalis*). A corn cutting attachment with a mulching appliance of this kind is shown in EP 3 269 223 A1 which is regarded as setting the generic type. The mulching appliance is attached to the combine header to pivot freely about the transverse axis, and is pretensioned downwards by a spring or an actuator and follows the contour of the ground by a skid.

A drawback with the prior art is that for adjusting the height and/or incline of the combine header, additional sensors are required which detect mechanically or contactlessly the height of the combine header above the ground, or that a harvester machine is required which automatically orients itself relative to the ground in a complicated fashion. The contactless sensors are relatively expensive and the mechanical sensors are comparatively sensitive to damage.

SUMMARY

An arrangement for controlling the height and/or incline of a combine header for harvesting thin-stemmed crops comprises a control device which is connected to a sensor for detecting the height of the combine header above the ground and to an actuator for controlling the height and/or incline of the combine header and which can be operated to control the actuator dependent on signals of the sensor. A mulching appliance with a processing tool for shredding plant stumps is attached vertically movable on the combine header and follows the contour of the ground, and the sensor is set up to detect the position of the mulching appliance with respect to the combine header.

In other words, the combine header provided for harvesting thin-stemmed crops is provided with a mulching appliance for processing the plant stumps which remain in the ground after harvesting, wherein the mulching appliance is supported vertically movable on the combine header to follow the contour of the ground. The position of the mulching appliance with respect to the combine header is detected by means of a sensor whose signals are transmitted to a control device which commands, based on this, an actuator for adjusting the height of the combine header above the ground and/or its incline about the transverse axis. The mulching appliance in this way fulfils two purposes, namely processing the plant stumps whilst serving as a scanner for the sensor for controlling the actuator.

The control device can be connected to a first actuator for controlling the incline of the combine header about the axis running horizontally and transversely to the forward direction, to a second actuator for controlling the height of the combine header with respect to the ground and to a further sensor for detecting the height of the combine header with respect to the ground, which is positioned in front of the mulching appliance, as in relation to the forward direction of the combine header.

The control device can be operated to adjust the actuators in the sense of maintaining a predetermined angle or height of the mulching appliance with respect to the ground, and a predetermined angle or a predetermined height of the combine header with respect to the ground.

The first actuator can adjust the angle of the combine header with respect to a feed conveyor of a self-propelled harvester machine about the axis running horizontally and transversely to the forward direction, and the second actuator can adjust the angle of the feed conveyor with respect to the harvester machine about the axis running horizontally and transversely to the forward direction.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic side view of a harvester machine with a combine header attached thereon and to which are attached one or more mulching appliances, with an assembly for controlling the height and incline of a combine header.

DETAILED DESCRIPTION

Those having ordinary skill in the art will recognize that terms such as "above," "below," "upward," "downward," "top," "bottom," etc., are used descriptively for the FIGURES, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

An agricultural harvester 10 shown in FIG. 1 in the form of a self-propelled field chopper is built on a frame 12 which is supported by front and rear wheels 14 and 16. The front wheels 14 serve as the main driving wheels, whilst the rear wheels 16 are steerable. The operation of the harvester 10 is undertaken from a driver's cab 18 from which a harvester header 20, e.g., a combine header 20, can be observed. Material, such as corn, taken up from the ground by means of the combine header 20 is moved through a feed conveyor 30 to a chopper drum (not shown) inside the harvester 10 which chops it into small pieces and forwards it to a conveying device (likewise not shown). The material leaves the harvester 10 onto a trailer, travelling alongside, through a vertically adjustable ejector bend 28 which is rotatable about the vertical axis. A secondary pulverizing device (not shown) can be arranged between the chopping drum and the conveying device. Although the disclosure is shown here on a field chopper, it can also be used on mowing threshers with associated combine headers in the form of corn pickers or cutting tools. Direction details such as front, rear, side and above refer in the following to the forward direction of the harvester 10 and the combine header 20 which in FIG. 1 runs to the left of the page.

The combine header 20 which is attached to the front side of the harvester 10 in the forward direction serves to pick up the crop material. The combine header 20 is in the illustrated embodiment a corn mowing attachment, known per se, which comprises a central part and two side parts arranged left and right at the sides next to the central part (in relation to the forward direction of the harvester 10). The side parts are fixed on the central part for pivotal movement upwards for road transport, and can be pivoted down hydraulically for harvesting so that they run parallel to the central part during harvesting operation.

The combine header 20 is equipped in a known manner with harvesting units 32, which comprise lower cutting discs and conveying discs arranged above the latter and having circumferentially distributed recesses for receiving the plant stalks, and with divider tips 34, cover plates and conveying means in order to feed the harvested crop material to the chopping drum of the harvester 10. The combine header 20 during operation draws in the stalks of the mowed material in the upright position, cuts them off and feeds them via the cross-conveyor drums and discharge conveyor drums to the feed conveyor 30, which is fitted with augers, and then to the chopping drum of the harvester 10.

The combine header 20 comprises a support frame which has a lower cross support 42 and an upper cross support 44. The lower cross support 42 extends down at the back of the combine header 20 and comprises three segments of which one each is assigned to the center part and one each side part. Gear housings 46 which serve to drive each harvesting unit 32 are screwed onto the front side of the lower cross support 42. A drive shaft 48 for driving the harvester units 32 via gears which are arranged in the gear housings 46 and which also serve to drive the further conveying means of the combine header 20 and are driven by an output shaft of the harvester 10, extends in the sideways direction inside the hollow lower cross support 42.

The upper cross support 44 extends in the sideways direction above the inlet of the feed conveyor 30 over its width. It is also connected by a first actuator 49 to a rear frame assembly 50 which is supported by hook-shaped supporting elements 52 on complementary supporting elements 54 of the housing of the feed conveyor 30. The upper cross support 44 is connected to the lower cross support 42 by vertically extending supports and connecting plates. The frame assembly 50 is connected to the lower cross support 42 by a lower pivotal axis 56. As a result, the first actuator 49 is able to turn the combine header 20 with the cross supports 42, 44 relative to the frame assembly 50 about the pivotal axis 56 which extends horizontally transversely to the forward direction. The frame assembly 50 is attached detachably on the feed conveyor 30 by the supporting elements 52. Any other adjustment assembly which provides a pivotal axis on the upper side of the feed conveyor 30 or at any other place could also be used to adjust the combine header 20 about the pivotal axis 56.

The incline of the feed conveyor 30 about an axis of rotation 58 oriented horizontally and transversely to the forward direction and which can coincide by way of example with the axis of rotation of the chopper drum, and (together with the first actuator 49) determines the height and incline of the combine header 20 relative to the ground, is determined by a second actuator 60 which is controlled by a control device 62.

A mulching appliance 64 is attached at the back of each harvesting unit 32. The mulching appliance 64 is arranged with its axis of rotation in a lateral direction to the rear of the axis of rotation of the associated harvesting unit 32. In normal harvesting operation the plants run in here. If a harvesting unit 32 cuts off several rows of plants, then several mulching appliances 64 can be assigned to it whose axes of rotation are arranged to the rear of the anticipated inlet places of the rows of plants. It would also be conceivable to spread the mulching appliances 64 with no gaps or with only small gaps over the entire working width of the combine header 20.

The mulching appliance 64 comprises two diametrically opposing cultivating tools 66 which are connected rigidly to a central shaft 68 by radial arms. Instead of rigid arms, the cultivating tools 66 could also be connected to the shaft 68 by chains or other flexible elements. The cultivating tools 66 are designed as obtuse impact bodies, i.e. have a spherical or cigar shape. Cutting blades could also be used alternatively or in addition as cultivating tools 66, such as those normally installed under corn pickers. These blades can be connected rigidly or in pendulum motion to the shaft 68.

The shaft 68 is connected by its lower end to the arms and by its upper end is mounted in a gearbox. The drive shaft 48 extends through a hollow shaft of the gearbox and is coupled in form-fitting engagement to the hollow shaft. The gearbox contains drive elements (not shown) which connect the hollow shaft (and thus the drive shaft 48) and the shaft 68 drive-wise, e.g. bevel wheels. The gearbox is mounted to pivot freely relative to the drive shaft 48 and the lower cross support 42 about the axis of the drive shaft 48. The gearbox and thus the shaft 68 can rotate freely about the axis of rotation of the drive shaft 48. The gearbox is connected to a cover plate 70 which extends backwards and downwards and is supported by its rear and lower end on the ground. A spring or actuator (not shown, see however EP 3 269 223 A1) can pretension the gearbox and thus the shaft 68 and cover plate 70 downwards (clockwise in FIG. 1) in order to produce a certain ground pressure and ensure that the mulching appliance 64 remains in a desired orientation relative to the ground. The mulching appliance 64 and its attachment is described in more detail in EP 3 269 223 A1 whose disclosure is incorporated by reference in the present documents.

A sensor 72 is supported on the combine header 20 and detects the rotational position of the cover plate 70 and thus of the mulching appliance 64 about its axis of rotation, which here coincides with the rotational and longitudinal axis of the drive shaft 48. A further sensor 74 detects the position of a height sensor 76 which is attached to the combine header 20, in the illustrated embodiment to a divider tip 34, in front of the mulching appliance 64.

The sensor 72 and the further sensor 74 are connected to the control device 62 which controls the first actuator 49 and the second actuator 60 based on the signals of the sensors 72, 74. Two degrees of freedom (namely the turning angle about the axes 56 and 58) are available through the two actuators 49 and 60 and make it possible on the one hand to allow the mulching appliance 64 to run over the ground at a suitable working height or at a suitable working angle with an incline of the angle of the shaft 68 (of e.g. about 30° backwards and upwards relative to the vertical), and on the other hand to align the harvesting units 32 at a suitable angle relative to the ground so that the rotational axes of the harvesting units 32 can be inclined forwards and upwards by way of example at an angle of 10° relative to the vertical. The control device 62 thus uses the signals of the sensors 72, 74 to control the actuators 49, 60 in such a way that the desired angles (or values of the sensors 70, 72 corresponding to these angles), can be reached.

Since with the present embodiment the angle of the mulching appliance 64 relative to the vertical is detected by the sensor 72, the height of the rear part of the combine header 20 is controlled by the control device 62 so that this angle corresponds to a target value. The incline of the combine header 20 and thus the angle of the harvesting units 32 in the drawing plane of FIG. 1 is then the second degree of freedom controlled by the control device 62. In a simple embodiment, the sensor 74 can only control the actuator 60, and the sensor 72 can only control the actuator 49. Since the adjustment of one of the actuators 49, 60 always influences the signals of the two sensors 72, 74, the change in the signal of one sensor 72 or 74 will always result in a successive adjustment of both actuators 49 and 60, until the height of the combine header 20 and its incline in the transverse direction correspond again to the target values. With a different embodiment, the control device 62 could comprise a table or database which contains control signals at both actuators 49, 60 in dependence on the signals of both sensors 72, 74.

The described arrangement for controlling the height and incline of the combine header 20 makes it possible not only to control the actuators 49, 60 in a way which follows the contours of the ground, but also reacts automatically to possible changes in the position of the rotational axis 58, which can be by way of example a consequence of fitting wheels 14 of a different size or a change in the pressure in the types of the wheels 14 or a sinking of the wheels 14 into the ground, since in all these cases the change is detected by the sensors 72 and 74, and is compensated by the actuators 49, 60.

Finally it should be pointed out that several height scanners 76 with sensors 74, and mulching appliances 64 with sensors 72, can be spread out over the width of the combine header 20 and can be used by the control device 62 to control an actuator (not shown), which adjusts the combine header 20 about an axis extending horizontally and in the forward direction relative to the feed conveyor 30.

The detailed description and the drawings or FIGURES are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A harvester machine comprising:
   a frame;
   a harvester header attached to the frame;
   a first actuator interconnecting the harvester header and the frame, and operable to control a tilt angle of the harvester header about a lower pivotal axis horizontally extending transverse relative to a forward direction;
   a second actuator interconnecting the harvester header and the frame, and operable to control a height of the harvester header relative to the ground surface;
   a mulching appliance attached to the harvester header and moveable with the harvester header about the lower pivotal axis, the mulching appliance having a pair of cultivating tools for shredding plant stumps, the pair of cultivating tools diametrically opposed to each other and attached to a central shaft for rotation about a substantially vertical axis of the central shaft relative to the forward direction;
   a cover plate attached to the harvester header and disposed rearward of the mulching appliance relative to the forward direction, the cover plate extending backwards and downward relative to the forward direction, wherein the cover plate is moveable relative to the harvester header to follow a contour of the ground surface;

a first sensor positioned to detect a position of the cover plate relative to the harvester header;
a second sensor positioned forward of the first sensor relative to the forward direction and positioned to detect a height of the harvester header relative to the ground surface at a location disposed forward of the mulching appliance;
a control system in communication with the first actuator, the first sensor, the second actuator, and the second sensor, wherein the control system is operable to receive a position signal from the first sensor related to the position of the cover plate and a position signal from the second sensor related to the height of the header, and output a control signal to one of the first actuator or the second actuator to adjust one of the height of the harvester header or the tilt angle of the harvester header, based on the position signal from the first sensor and the position signal from the second signal.

* * * * *